Oct. 12, 1965 C. J. ARNDT 3,211,278
IMPACT IDLER
Filed April 5, 1963
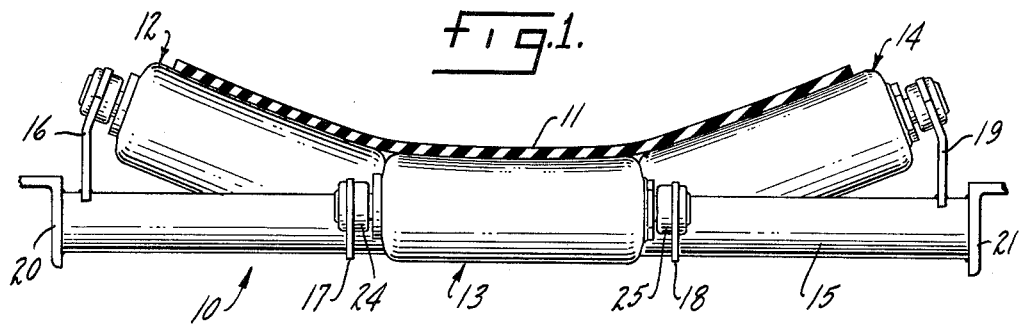
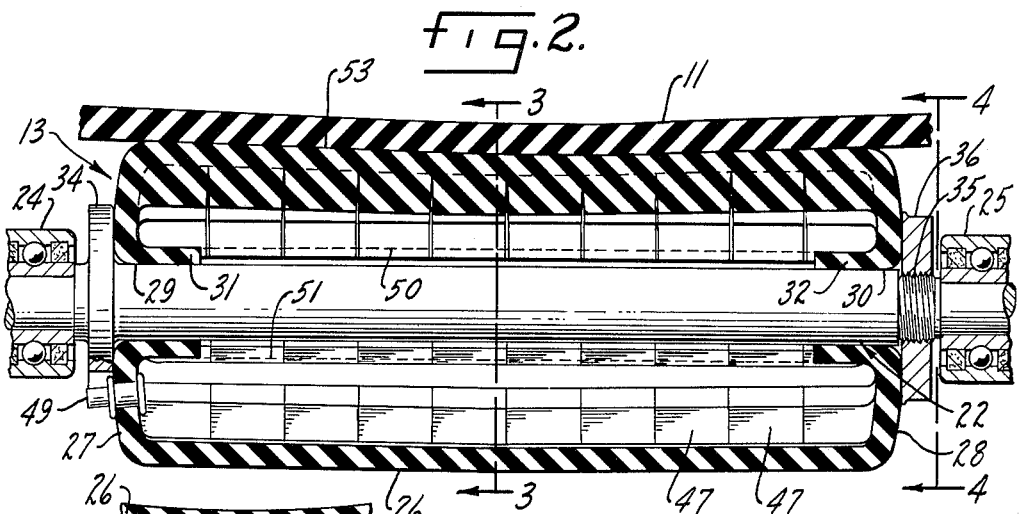
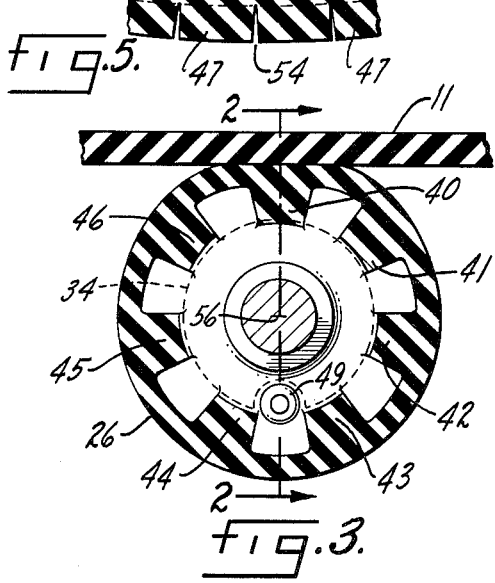
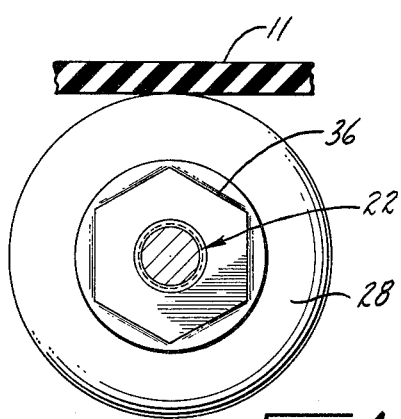
INVENTOR.
Charles J. Arndt,
BY Parker & Carter
Attorneys.

United States Patent Office 3,211,278
Patented Oct. 12, 1965

3,211,278
IMPACT IDLER
Charles J. Arndt, Harvey, Ill., assignor to Goodman Manufacturing Company, Chicago, Ill., a corporation of Illinois
Filed Apr. 5, 1963, Ser. No. 270,862
2 Claims. (Cl. 198—192)

This invention relates to conveying apparatus, and specifically to an impact roller assembly especially adapted for use at loading points or other high impact areas in a flexible belt conveyor.

Belt conveyors, and particularly flexible belt conveyors, usually include a plurality of idler assemblies which support at least the conveying reach of the belt. The idler assemblies are supported from side frames which in turn are anchored to supporting structure. The idler assemblies generally include one or more roller assemblies which are so positioned as to form a trough which forms a bed for the belt. When roller assemblies having rollers of uniform diameter are employed, a pair or more of wing rollers is generally arranged to flank a center roller or rollers.

Generally, the idler assemblies, and the roller assemblies which comprise them as well, are made as light as possible to facilitate handling, manufacture, and reduce the cost as much as possible. Often, however, a stronger and, therefore, a heavier assembly is needed at areas or points at which the belt is being loaded. That is, in use, material to be conveyed by a conveyor is dumped onto the conveyor at a fixed point or at a localized area and then conveyed to a distant discharge point. The idler assemblies which support the belt in the region of the loading point are subjected to considerably heavier abuse than those assemblies which merely support the load as it is carried along by the belt. These idler assemblies are often referred to as impact idlers, and are quite freqently composed of a deformable material such as rubber. The individual rollers in the impact idler assemblies at impact points are frequently deformed under the impact of material which is dumped onto the belt. While deformation of the roller assemblies is undesirable at all locations it is especially detrimental at loading points because at those points it displaces the center of gravity of the roller assemblies away from the roller axis. Consequently, the roller wobbles. As the roller wobbles it takes on the characteristics of an eccentric. The bearings, therefore, wear at a much faster than normal rate, thus shortening the life of the bearings and other roller components.

Wobbly rotation of the rollers also tends to increase the power requirements because of the eccentric characteristics of the roller. Roller wobble may also result in a variation in the magnitude of the frictional force between the belt and roller, and thereby variations in the driving force between the belt and roller assemblies. Further, impact rollers whose masses are displaced from free rotation also tend to wear at a rather rapid rate, due to the generation of internal heat and friction. Various attempts to overcome these undesirable effects appear to have been made.

An enlarged, thin walled rubber roller has been proposed. Although this construction may have good impact absorption qualities, it sags too much under impact, thus inducing wobbly rotation with its attendant disadvantages.

A thick, rubber roller has been proposed. Such a construction may have greater resistance to displacement, and, therefore, less tendency to rotate erratically, but its impact absorption ability is not adequate and such a roller is quite expensive.

Other arrangements, such as thin, multiple, rubber tire-like elements placed side by side, and rollers with extra bearings have been proposed. All of these arrangements have undesirable performance or cost characteristics.

Accordingly, it is an object of this invention to provide an impact roller assembly in which substantially true rotation of the roller assembly is maintained even when the assembly is subjected to impact loads.

Another object is to provide a roller assembly having a maximum cushioning effect to thereby minimize the detrimental effects of impacts.

Another object is to provide a rotatable impact roller assembly which has, in effect, two working thicknesses; a first, relatively thin thickness which provides easy yieldability in the impact area, and a second, relatively thicker thickness which provides great resistance to axial displacement of the roller.

A further object is to provide a hollow roller assembly composed of the material having the characteristics, with respect to distortability and flexibility, of rubber, in which an impact against the roller, and the consequent uneven displacement of mass with respect to the center of rotation of the roller, is at least partially offset by the distortion of the roller assembly material.

Yet a further object is to provide an impact roller which maintains good belt-roller contact at all times, including during periods of impact.

Another object is to provide an impact roller assembly in which the service life of the roller assembly bearings and other idler components is maximized, even under severe impact conditions.

Yet a further object is to provide an impact roller assembly having smooth surfaced rollers and a plurality of concentrically arranged, substantially identically shaped internal distortion compensating members which, when the roller is distorted due to an impact load, are automatically urged into a condition of rotational balance.

Other objects and advantages of the invention will be apparent upon a further reading of the description.

The invention is illustrated more or less diagrammatically in the accompanying drawing wherein FIGURE 1 is an elevation of an impact idler assembly embodying the principles of this invention;

FIGURE 2 is a section thru the center roller assembly of FIGURE 1, the section being taken substantially along the line 2—2 of FIGURE 3;

FIGURE 3 is a section taken substantially along the line 3—3 of FIGURE 2;

FIGURE 4 is a sectional view taken substantially along the line 4—4 of FIGURE 2; and FIGURE 5 is a detailed view of a portion of the interior of the roller assembly in its position when subjected to a high impact.

Life reference numerals will be used to refer to like parts throughout the following description of the drawing.

An impact idler assembly is indicated generally at 10 in FIGURE 1. The idler assembly supports a conveyor belt 11 which, in this instance, is a flexible rubber belt.

The idler assembly consists essentially of a plurality of roller assemblies each of which is indicated generally at 12, 13 and 14. The roller assemblies are arranged in generally end to end relationship with respect to one another. In this instance, the roller assemblies are supported from a tubular cross bar 15 by suitable brackets 16, 17, 18 and 19. A pair of flanges 20 and 21, or any suitable members are welded, or otherwise suitably secured, to the ends of tubular cross piece 15. The flanges, in turn, may be connected to ground engaging or other support structure such as a wire rope side frame of the type illustrated in the Craggs et al. Patent 2,773,257.

Each roller assembly consists essentially of shaft means and a roller shell whose axis is concentric with the axis of the shaft means. In this instance, the shaft means is a live solid metal shaft which extends thru the roller shell. The end portions of the shaft are received in bearings 24, 25, which in turn are supported from the brackets 17 and 18 of the idler assembly. Since the construction of the bearings is not essential to an understanding of the invention, and the illustrated embodiment is exemplary only, the bearings and associated supporting structure will not be further shown or described.

The roller consists essentially of a shell casing 26 which, in an unloaded condition, is cylindrical. The cylindrical shell casing terminates, at each end, in radially inwardly extending end walls 27, 28. The end walls are apertured, as at 29, 30, to provide admission of the shaft means. An inwardly turned lip 31, 32 which forms the apertures 29, 30 snugly receives the shaft means. Advantageously the apertures 29, 30 may be slightly smaller than the diameter of the shaft so that a close contact is provided between the shaft and inturned lips. Preferably the length of the inturned lips is sufficient to form an air-tight seal between the shaft and roller.

The left portion of shaft means 22 has a collar or flange 34 formed thereon which provides an abutment for the left end wall 27 of the roller. The right end of the shaft is threaded as at 35 and a removable collar 36 is threaded thereon which, when tightened, bears against right end wall 28.

The roller shell has a plurality of rows of projections 40, 41, 42, 43, 44, 45, 46 extending generally radially inwardly from the shell casing 26. Each row is formed of a plurality of generally radially inwardly extending internal members 47. Although the exact shape and construction of the internal fingers may be varied within the scope of the invention, it is important that they extend radially inwardly and that there be clearance at least between adjacent rows 40–46. Internal members are integrally formed with the roller casing 26, as best seen in FIGURE 3. Preferably, the casing and internal members are formed of a material having the general characteristics as to distortability and flexibility of rubber.

Left end wall of the roller shell is apertured to receive a filler valve 49. If the inturned lips 31, 32 of the roller shell grip the shaft means 22 tightly enough, an air-tight compartment is formed within the roller casing. In some instances, it may be desirable to utilize an adhesive material between the lips 31, 32 and the shaft means in order to insure a fluid tight seal. The nut, or removable collar 36, may likewise be tightened on the shaft means to further urge the lips into snug engagement with the shaft means.

In this instance the inturned lips 31, 32 have been shown as extending only a short distance inwardly from the end walls 27, 28, respectively. As indicated by the dotted lines 50, 51, however, the lips can extend the complete span between the end walls and the air-tight chamber thereby formed solely by the rubberlike material. In this event, adhesive between the lips and shaft means 22 can be dispensed with.

The use and operation of the invention are as follows:

Prior to use a compressible fluid is admitted to the hollow roller to create a greater than atmospheric pressure within the roller. Preferably the fluid will be air. Once a suitable pressure has been generated within the shell it is in condition to receive, and counteract, impact loads.

In the FIGURE 2 position the upper portion of shell casing 26 has been slightly depressed as can be best visualized by the slight curvature 53 to the upper shell casing shown in FIGURE 2. The amount of depression is not great, as can be readily determined by noting that the spread between adjacent internal projecting members 47 is rather slight.

When an impact is transmitted to the roller shell, however, the internal projections 47 in the upper rows, particularly row 40, are spread apart a considerable distance, as indicated by the wide spacing 54 between adjacent projections, shown best in FIGURE 5. Since the individual internal projections or members are separated from one another, by impact, the effective impact resisting thickness of impact receiving material in the area of impact is only the thickness of the roller shell 26.

Those portions of the roller shell outside the impact receiving area will tend to be displaced generally radially outwardly due to the impact per se, the amount of outward displacement due to this cause tending to be greatest in areas most remote from the point of impact. This outward displacement is also partially attributable to the increase in internal fluid pressure resulting from a decrease in internal volume under impact. Outward displacement of the shell is resisted, however, by the bridging, or stiffening, effect provided by the internal members. That is, outward bowing of the roller shell in those areas which carry bottom rows 43 and 44, for example, will result in the projections 47, which are in abutting relation to one another under no load conditions, to be crowded together axially. Since rubber, or materials of similar properties, will not compress, but only distort, the internal members remain in snug abutting engagement and take on the load resisting quantities of a solid, elongated structural member. In effect, the deformation resisting thickness of the roller is the thickness of the roller shell 26 plus the length of the internal projections 47, this stiffening or bridging effect being most pronounced in areas most remote from the area of impact.

The roller, therefore, has a multiple, or at least a double, thickness. The thickness in the area of impact is relatively thin, consisting of only the thickness of the roller shell 26. This minimum thickness provides maximum cushioning or impact absorption. The thickness in the area most remote from the are of impact consists of the thickness of the roller shell 26 plus the elongated teeth 47. This maximum thickness provides minimum cushioning or impact absorption, but maximum displacement resistance. The effective thickness at areas between the area of impact and bottom rows 43, 44 will be somewhere between the two extremes. This double thickness provides maximum impact absorption where most needed, and maxium displacement resistance where most needed.

The bridging or beam effect of the internal members can be varied by varying the length and/or width of the individual internal projections. It may also be desirable, under some conditions, to separate the end tooth in each row from the end wall 27, 28.

The ratio of the length of the roller shell to the shell diameter can be varied, depending on the demands of any particular environment. A 2 or 3 to 1 ratio may be employed for perhaps the great bulk of applications, and a ratio of about 2½ to 1 will be most suitable for a large number of applications.

As above mentioned, an increase in internal fluid pressure will act perpendicularly against all surfaces in the roller and accordingly the internal members in bottom rows 43 and 44 will be squeezed, or distorted. That is, rubber, or materials which have similar distortion and flexibility characteristics, are generally not readily compressible in the sense that a given mass of a given volume can be "compressed" into a similar mass of lesser volume. Rather, rubber, and materials similar to it, will distort. In this instance the internal members of bottom rows 43, 44 will tend to elongate upon an increase of fluid pressure within the roller shell.

Another advantageous attribute of the rows of teeth 40 to 46 is the sag resisting effect which normally follows from the use of a greater than atmospheric internal pressure within the roller. That is, in prior structures the roller shell has tended to balloon outwardly upon imposition of a greater than atmospheric internal pressure within the roller, which frequently resulted in sagging of the roller. This ballooning effect of the air pressure is effectively countered in this invention by the stiffening or bridging imparted to the roller shell by the side-by-side teeth in the individual rows. The greater the internal air pressure, the more tightly the radial sides of each tooth will be pressed against the radial sides of each abutting tooth, and the greater will be the resistance to outward bowing of the roller shell. Again, this is true because, in effect, the thickness of the resisting material is the thickness of the roller shell plus the length of the teeth, rather than merely the thickness of the roller shell. This effect follows independently of the location and magnitude of impact. The net result is that the teeth tend to maintain a substantially constant roller diameter, particularly when running under no load and light load.

The net result of the above discussed effects is that the eccentric action resulting from the imposition of an impact on the roller shell is very much reduced, if not entirely eliminated.

The closer the center of gravity is maintained to the center of rotation 56, the smoother running will be the rotor shell. True rotation, that is smooth running of the roller assembly, results in minimum bearing wear and minimum vibration shocks being transmitted to the balance of the assembly with a consequent prolongation of life of the other roller components.

Although an exemplary embodiment of the invention has been illustrated and described, it should be understood that the invention is not confined to the said disclosed embodiment. Rather, it is the intention that the scope of the invention be limited only by the scope of the hereafter appended claims when interpreted in the light of the pertinent prior art.

I claim:
1. An impact roller assembly for use with a flexible belt, said impact roller assembly including, in combination,
   a roller shell,
   said roller shell including a cylindrical casing,
   said shell being composed of a material having the general characteristics, with respect to distortability and flexibility, of rubber,
   means for forming, in conjunction with the casing, a fluid tight compressible fluid chamber to thereby provide a cushioning effect for impact loads,
   a plurality of rows of projections carried by and rotatable with the roller casing, said rows of projections extending generally radially inwardly from the casing,
   said rows of projections being composed of a material having the general characteristics, with respect to distortability of flexibility, of rubber,
   each row of projections being spaced from its flanking rows a substantial peripheral distance, said rows being spaced circumferentially a distance sufficient to enable said members to distort in a radially inward direction,
   each row of projections being divided into a plurality of discrete members whereby a radially inwardly directed force applied to the exterior of the roller shell will cause a separation between adjacent members in each row in a direction parallel to the axis of rotation of the roller assembly,
   said members being spaced axially such that adjacent members in a first area of the roller casing subjected to radially inwardly directed impact will separate to provide a minimum stiffening effect, yet similar adjacent members in a second area which is substantially diametrically opposite the aforesaid first area will buttress one another to provide a maximum stiffening effect.

2. The impact roller assembly of claim 1 further characterized firstly, in that the rows of projections are substantially regularly spaced peripherally, one from the other, and substantially identically shaped, one to the other, about the casing,
   said rows of projections extending completely around the internal periphery of the roller casing, and secondly, in that the rows of projections extend from end to end of the roller shell.

References Cited by the Examiner
UNITED STATES PATENTS

| | | | |
|---|---|---|---|
| 616,462 | 12/98 | Harden | 152—327 |
| 1,378,313 | 5/21 | Beasley | 152—327 X |
| 2,007,910 | 7/35 | Stephens | 198—184 X |

SAMUEL F. COLEMAN, *Primary Examiner.*

WILLIAM B. LA BORDE, *Examiner.*